C. T. BOYER.
NUTCRACKER.
APPLICATION FILED FEB. 18, 1915.
1,192,846.
Patented Aug. 1, 1916.
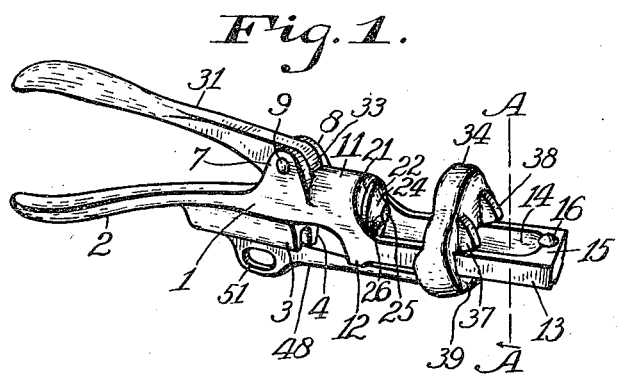
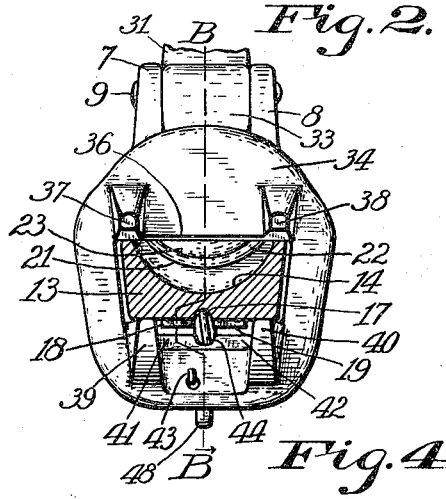
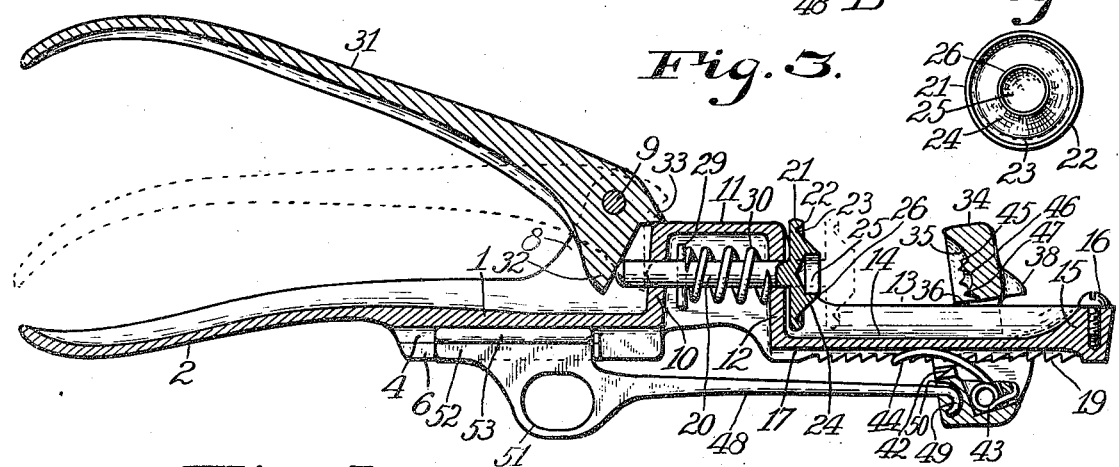
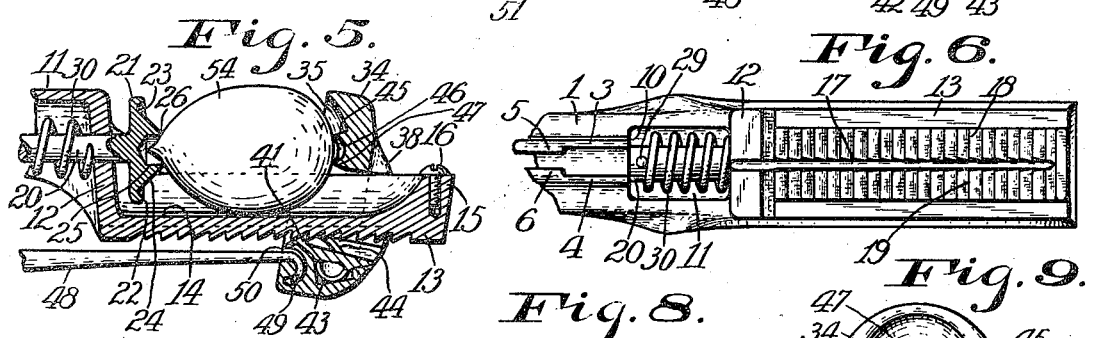
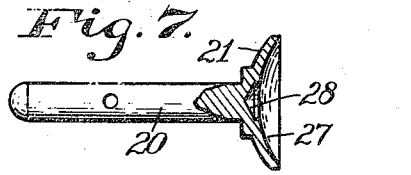
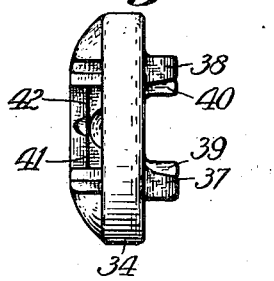
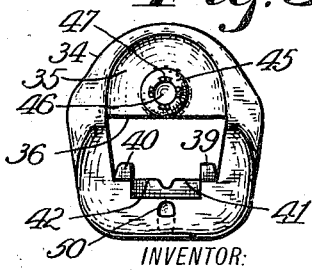
WITNESSES:
J. H. Gardner
M. E. Sparrow
INVENTOR:
Charles T. Boyer,
BY
E. T. Silvius,
ATTORNEY

UNITED STATES PATENT OFFICE.

CHARLES T. BOYER, OF INDIANAPOLIS, INDIANA.

NUTCRACKER.

1,192,846.  Specification of Letters Patent.  Patented Aug. 1, 1916.

Application filed February 18, 1915. Serial No. 9,039.

*To all whom it may concern:*

Be it known that I, CHARLES T. BOYER, a citizen of the United States, residing at Indianapolis, in the county of Marion and State of Indiana, have invented a new and useful Nutcracker, of which the following is a specification, reference being had to the accompanying drawings, and to the letters and figures of reference marked thereon.

This invention relates to machines or implements for breaking up the shells of hard-shell nuts for the purpose of obtaining the kernel or edible substance thereof, and has reference more particularly to a hand-operated lever type of nut-cracker of the above mentioned character.

An object of the invention is to provide a nut-cracker that shall be so constructed as to be capable of thoroughly cracking the shells of nuts without causing destructive crushing of the kernels of the nuts, to the end that the kernels may be obtained in whole, or nearly whole, condition or not broken up into small portions.

Another object is to provide a nut-cracker that shall have very powerful power devices having limited controllable range of movement, in order that the power action required for cracking the nut shells shall be arrested following the breaking up of the shells without continuing in action and crushing and destroying the normal appearance of the kernels.

Still another object is to provide a quick-acting nut-cracker that shall be fully qualified for cracking various sizes and kinds of nuts and be readily adjusted to the different sizes of nuts, and also from the diameter of the major axis to that of the minor axis of any nut while the cracking operations are being performed.

A further and more specific object is to provide a nut-cracker that shall be capable of producing a large number of lines of fracture in a nut shell without causing fragments of the shell to be thrown off and scattered to produce unsightly and troublesome debris, and which nut-cracker shall be more especially qualified for cracking the shell of pecan nuts, and particularly those of the more popular "paper shell" variety.

With the above-mentioned and other objects in view, the invention consists in a machine or implement comprising a main part having a guide on which an abutment is adjustably connected, and power means connected with the main part and movable to a limited extent toward the abutment, the abutment preferably being provided with hand-controlled means for its adjustment; and the invention consists further in the novel parts, and in the combinations and arrangement of parts, as hereinafter particularly described and further set forth in the accompanying claims.

Referring to the drawings,—Figure 1 is a perspective view of the improved nut-cracker as preferably constructed; Fig. 2 is a sectional elevation approximately on the line A A on Fig. 1; Fig. 3 is a longitudinal central section of the machine on a plane corresponding nearly to the line B B on Fig. 2; Fig. 4 is a front elevation of the head of the power-operated device of the machine as preferably constructed; Fig. 5 is a fragmentary section on the line B B on Fig. 2; Fig. 6 is a fragmentary inverted plan of the machine minus the adjustable abutment; Fig. 7 is a sectional plan of the power-operated device slightly modified; Fig. 8 is a top plan of the improved abutment; and, Fig. 9 is an elevation of the abutment.

Similar reference characters on the different figures of the drawings indicate corresponding parts or features of the invention hereinafter referred to in detail.

The improved nut-cracker comprises a main part having a central base portion 1 provided on one end thereof with a handle member 2, and preferably is provided on the under side thereof with a guide comprising two bars 3 and 4 that extend downward and have guide ribs 5 and 6 respectively that extend each toward the other for removably retaining a slide that may be advantageously employed in the construction of the machine. The normal upper side of the base portion is provided with a pair of pivot ears 7 and 8 that support a pivot 9. The central or middle portion of the main part has a housing thereon which comprises an upright end wall 10 on the forward end of the base portion 1, being connected with the pivot ears, an arch 11 connected to and extending forward from the wall 10, and a front end wall 12 connected to the arch, the end walls being constructed to constitute guides for a ram. The main part comprises also a guide-bar 13 that is cast integrally with the wall 12 and the arch of the housing and extends forward therefrom, the guide-bar having a longitudinal trough-like channel 14 therein extending forward from the wall 12 nearly to the front end portion 15 of the guide-bar, for supporting the nuts and the abutment, the end portion 15 being provided with a removable stop-screw 16 for removably retaining the abutment on the bar. The under side of the guide bar has a longitudinal guide groove 17 and also transverse teeth 18 and 19 on opposite sides respectively of the groove, the teeth being of the ratchet-tooth type arranged with their vertical faces presented rearward or toward the handle member 2. The entire main part may suitably be composed of cast metal, and in order to avoid excessive weight may be made of suitably hardened aluminum alloy.

A suitable ram is provided and in different machines may be variously modified, the ram comprising a main portion or stem 20 that is suitably guided in the housing ends 10 and 12 to move longitudinally on a plane parallel with the guide bar 13, and a suitable head 21 on the forward end of the stem. Preferably the front of the head has a marginal annular flange or rim 22 that extends forward so that a concavity or saucer-shaped face 23 is formed, and from which extends a hollow punch formed as a cone 24 having a central recess 25 in its end so that an annular front cutting edge 26 is formed, the edge, however, being slightly blunt so as not to be frail or become dulled in use. In some cases the front of the head has a saucer-shaped face 27 in the middle of which is a guide cavity or recess 28 to receive the pointed ends of nut shells so as to prevent the nuts from being forced out of the saucer-shaped face.

The ram head 21 is arranged forward of the wall 12 so as to operate along the channel 14 in the guide bar. The stem portion 20 of the ram is provided with a suitable stop device 29 and a spring 30 extending about the stem and seated against the end wall 12 and the stop device for retracting the ram. A lever 31 is connected between the ears 7 and 8 to the pivot 9 and extends above the handle member 2, the lever having a downward extending finger 32 that is normally in engagement with the rear end of the ram, the spring of which forces the finger rearward so as to push the lever upward until stopped by a projection 33 on the lever that comes into contact with the top of the end wall 10 of the housing.

The improved abutment comprises a main portion 34 having a concave face 35 on one side of the upper portion thereof that is presented toward the ram, the main portion having a suitable opening 36 therein conforming to the cross-sectional contour of the guide-bar 13 to receive the guide-bar which supports the abutment. The opposite side of the abutment has extensions 37 and 38 thereon that afford substantial bearings upon the guide-bar when the abutment is slightly tilted away from the ram, the extensions being above the plane of the top of the aperture 36. Below the aperture the main portion of the abutment preferably also has guide extensions 39 and 40 to afford ample guiding surface on the under side of the guide-bar. The lower portion of the abutment has ratchet teeth 41 and 42 adapted to be brought into clutching engagement with the teeth 18 and 19 respectively when the abutment is slightly tilted for preventing the abutment from being forced outward by the advancing ram. A spring 43 is supported in the lower portion of the abutment below the aperture and it has an arm 44 that extends out through the aperture and into the guide groove 17, for tilting the abutment, so as to release its teeth from the guide-bar teeth.

Preferably the concave face 35 of the abutment has a conical projection 45 thereon that has a central recess 46, the front edge of the projection having teeth 47 thereon that are capable of being forced through the shell of the nut in order to cause fracture of the shell with the minimum expenditure of force.

For the purpose of permitting the actuating lever to be operated and the abutment adjusted by one hand, a connecting-rod 48 preferably is provided and is suitably coupled to the lower portion of the abutment, the rod preferably having a hook 49 on its end that is hooked into a suitable recess 50 formed in the abutment, the rod extending backward under the base portion 1 and having an aperture 51 to receive the finger of the operator for moving and controlling the rod, which is provided also with a slide or guide bar 52 that is longitudinally guided between the guide ribs 5 and 6 and has a relatively thicker guide portion 53 that extends behind the ribs to retain the connecting rod in proper position. It will be obvious that in the construction of the cheaper machines the connecting rod may be omitted.

In practical use a nut 54 is placed in the channel 14 between the ram and the abutment, after which the abutment is moved toward the ram and pushes the nut with it, until the nut is stopped by contact with the ram, after which the lower portion of the abutment is pushed slightly farther so as to cause the abutment to tilt slightly as shown in Fig. 5, so that the teeth of the abutment is brought into contact with the teeth of the guide bar. Upon forcing the lever 31 toward the handle member 2, the finger 32 projects the ram and by means of the intervening nut causes the locking of the abutment to the guide bar, further movement of the ram causing fracture of the shell of the nut. If the preferred form of ram head is used a small hole is punched in the end of the shell, after which the conical side expands the hole and causes cracking of the shell in nearly all directions outward therefrom, the ram being advanced until the saucer-shaped face 23 reaches the ragged edge of the shell around the hole, and further advancement of the ram tends to bulge the main portions of the shell outward and thus cause further cracking. When the ram is projected and forcibly engages one portion of the nut, the opposite portion of the nut shell is punctured by the teeth 47 which start cracks in the shell and permit the conical side 45 of the projection to force the cracked portions of the shell apart. In some cases the entire shell may not be thoroughly cracked at the first operation, but may readily be turned to different positions so as to bring the uncracked portion against the ram head, and after readjusting the abutment the ram may be again projected so as to further break up the shell. On finishing the cracking operations it will be found that the fragments of the shell may be removed from the kernel in small pieces without breaking up the kernel, the latter in most cases being either entirely whole or in two parts, depending upon the formation of the kernel.

Having thus described the invention, what is claimed as new is—

1. A nut-cracker having an abutment to support a nut, and a head movable toward or from the abutment, the front of the head being provided with an annular hollow punch having a conical exterior and also a rim extending about the base of the exterior of the punch.

2. A nut-cracker including a guide, an abutment adjustably mounted on the guide to support the nut, and a ram movably mounted on one end of the guide to be projected toward the abutment, the front of the ram being constructed for puncturing and subsequently expanding the shell of the nut.

3. A nut-cracker including a main part having a guide bar, an abutment on the bar having on one face thereof a conical projection, the end of the projection having a central recess forming an annular cutting edge, the edge having a plurality of projecting teeth thereon, and a head mounted on the main part and movable toward the cutting edge and the teeth.

4. A nut-cracker including a main part having a guide bar, an abutment adjustable on the bar and tiltable to be clutched to the bar, a ram mounted on the main part and projectable toward the abutment above the guide bar, and a connecting rod extending under the main part and movably guided thereby, the rod being connected to the abutment below the guide bar for controlling the abutment and provided with a finger-hole for operation of the rod.

5. A nut-cracker including a main part having a longitudinal channel adjacent to one end portion thereof, the opposite end portion of the part being constructed to constitute a handle, a ram movably guided on the main part and projectable above and longitudinally of the channel, a lever pivotally connected to the main part adjacent the ram for projecting the ram, and an abutment adjustable on the channeled portion of the main part opposite the front of the ram and provided with means for securing it to the channeled portion of the main part.

6. A nut-cracker including a main part having a guide bar provided on the under side thereof with ratchet teeth, the upper side of the bar having a longitudinal channel therein, an abutment having an aperture therein loosely receiving the guide bar and permitting tilting of the abutment on the bar, the abutment having a tooth thereon below the guide bar for engagement with the ratchet teeth, the upper portion of the abutment above the tooth having a concave face, a spring in the abutment engaging the bar to hold the tooth from the ratchet teeth, and a head mounted on the main part and movable toward the concave face.

7. A nut-cracker including a main part having a guide bar forming one end portion and a handle member forming the opposite end portion thereof, the main part having a housing on the middle portion thereof, a ram movably mounted in the housing and projectable parallel to the guide bar, the ram having a head thereon and provided in the housing with a projecting device, a spring supported in the housing and engaging the device for retracting the ram, an abutment on the guide opposite to the head of the ram, and a lever pivotally connected to the main part adjacent the housing and extending divergently from the handle member, the lever having a finger in contact with the rear end of the ram and also a projection normally in contact with the top of the housing.

In testimony whereof, I affix my signature in presence of two witnesses.

CHARLES T. BOYER.

Witnesses:
E. T. SILVIUS,
M. E. SPARROW.